US009538530B2

(12) United States Patent
Cha

(10) Patent No.: US 9,538,530 B2
(45) Date of Patent: *Jan. 3, 2017

(54) DEVICE AND A METHOD FOR DETECTING KEEP-ALIVE AND A RECORDING MEDIUM THEREOF

(71) Applicant: IDEAWARE INC., Seongnam-si, Gyeonggi-do (KR)

(72) Inventor: Yang Meong Cha, Seongnam-si (KR)

(73) Assignee: IDEAWARE INC., Seongnam-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/434,929

(22) PCT Filed: Oct. 7, 2013

(86) PCT No.: PCT/KR2013/008934
§ 371 (c)(1),
(2) Date: Apr. 10, 2015

(87) PCT Pub. No.: WO2014/058190
PCT Pub. Date: Apr. 17, 2014

(65) Prior Publication Data
US 2015/0289262 A1    Oct. 8, 2015

(30) Foreign Application Priority Data

Oct. 10, 2012  (KR) .......................... 10-2012-0112566

(51) Int. Cl.
*G01R 31/08*        (2006.01)
*H04W 72/04*     (2009.01)
(Continued)

(52) U.S. Cl.
CPC .......... *H04W 72/0446* (2013.01); *H04L 43/00* (2013.01); *H04W 24/08* (2013.01);
(Continued)

(58) Field of Classification Search
USPC ......................................................... 370/230
See application file for complete search history.

(56) References Cited

U.S. PATENT DOCUMENTS 6,067,628 A * 5/2000 Krithivas .............. G06F 11/221
710/63
6,108,306 A * 8/2000 Kalkunte ............ H04L 12/5602
370/235

(Continued)

FOREIGN PATENT DOCUMENTS

KR    10-2004-0105973 A    12/2004
KR    10-2006-0091158 A     8/2006
(Continued)

*Primary Examiner* — Phuongchau Ba Nguyen
(74) *Attorney, Agent, or Firm* — Novick, Kim & Lee, PLLC; Sang Ho Lee

(57) ABSTRACT

The present invention relates to a device and a method for detecting keep-alive, comprising a collecting unit for collecting or capturing a plurality of packets transceiving between a plurality of wireless terminals and a plurality of servers, a preprocessing unit for mapping collecting or capturing time information of the packets which collected or captured by the collecting unit to at least one of identification information of wireless terminal, server identification information and port information, a slot allocation unit for allocating the mapped packets to each time slots on a timeline which generated according to the collecting or capturing time information, an ID(identification) assigning unit for assigning IDs to each sections on the timeline, wherein the assigning unit assigning same IDs to sections having time slots in which the packets are continuously allocated within a predetermined range; and a keep-alive detection unit for setting the sections which assigned same IDs to periodic sections, and for determining the periodic (Continued)

sections to keep-alive sections when ports of the packets allocated to the time slots on the periodic sections are continuously changing.

12 Claims, 17 Drawing Sheets

(51) Int. Cl.
| | |
|---|---|
| H04L 12/26 | (2006.01) |
| H04W 24/08 | (2009.01) |
| H04W 76/04 | (2009.01) |
| H04W 52/02 | (2009.01) |
| H04L 12/801 | (2013.01) |
| H04W 28/06 | (2009.01) |

(52) U.S. Cl.
CPC ... H04W 52/0219 (2013.01); H04W 52/0229 (2013.01); H04W 76/045 (2013.01); *H04L 47/10* (2013.01); *H04W 28/06* (2013.01)

(56) References Cited

U.S. PATENT DOCUMENTS

| | | | |
|---|---|---|---|
| 6,507,565 B1* | 1/2003 | Taylor | H04L 41/00 370/242 |
| 2005/0005169 A1* | 1/2005 | Kelekar | H04L 63/1408 726/4 |
| 2008/0235273 A1* | 9/2008 | Shipilevsky | G06F 3/0481 710/16 |
| 2015/0271828 A1* | 9/2015 | Cha | H04L 43/00 370/230 |
| 2015/0289262 A1* | 10/2015 | Cha | H04L 43/00 370/252 |

FOREIGN PATENT DOCUMENTS

| | | |
|---|---|---|
| KR | 10-2008-0038325 A | 5/2008 |
| KR | 10-2010-0085240 A | 7/2010 |
| KR | 10-1157268 B1 | 6/2012 |

* cited by examiner

DEVICE AND A METHOD FOR DETECTING KEEP-ALIVE AND A RECORDING MEDIUM THEREOF

BACKGROUND OF THE INVENTION

1. Technical Field

The present invention is to detect a keep-alive periodicity for each application which causes wireless network load.

2. Description of the Related Art

After supplying smart-phones, patterns using a wireless terminal for individuals are abruptly changed from voice communication to data communication.

In FIG. 1 shown as mobile wireless data traffic index, mobile traffics are expected to increase to 26 times in the next 10 to 15 years, and mobile data amount of 15 MB used by individuals per day has been used in 2010 but mobile data amount of 1 GB will be used in 2020.

The increase of the mobile traffics directly effects on profitability and service quality of the mobile-service company and accompanies a service provider, that is, a mobile-service company's equipment expansion, and therefore profit aggravation is inevitable and a user using a mobile network has service dissatisfaction due to data communication velocity delay.

Therefore, the mobile-service company must effectively use network infra to reduce investment burden and to guarantee service quality and an alternative guaranteeing predictability and real-time control is needed due to the limits of current solutions.

In usual network communication, an application for communicating with a server connects to server through a network, transmits and receives desirable data, and processes closing the network with the server after that.

But when the application does not transmit or receive any packets with the server during connecting to the network, the server or the network may force to disconnect the connection to the network after a predetermined time by considering as disabled network connection for managing resources. A simple chat program explains problems of undesired disconnection from the network. In the simple chat program, a server may transfer massages from a user A to a user B or may transfer massages from the user B to the user A when the user A and the user B are both connected to the server and maintaining the network connection. But the server cannot transfer massages from a user B to a user A when the user A is disconnected from the server by the server or the network because the user A did not chat for a while.

Thus, for maintaining the network connection, the application is implemented as to send small packets periodically which are called Keep-Alive packets even if a user doesn't send messages.

But it makes a problem for inducing overload of mobile networks by generating much signals when transmit and receive packets which are not having much information with the server for maintaining network connection because the wireless terminal doesn't know when the messages are coming from the server.

In order to solve much cost consumption of the mobile communication company due to network jam and service dissatisfaction for users of the wireless terminals, a method for blocking periodic network usage by a plurality of applications disposed at the wireless terminals is absolutely needed, but there is no a solution for this.

SUMMARY OF THE INVENTION

An advantage of some aspects of the invention is that it provides a device and method for detecting keep-alive periodicity, and recording medium capable of disconnecting unnecessary periodic network connection for the applications installed at the wireless terminals by detecting keep-alive periodic sections of periodic sections (constant time intervals) on transceiving packets between a specific server and wireless terminal in a mobile network.

According to an aspect of the invention, there is provided a device for detecting keep-alive packets, comprising: a collection unit for collecting or capturing a plurality of packets transceived between a plurality of wireless terminals and a plurality of servers through a network; a preprocessing unit for processing mapping by connecting the packets collected or captured by the collection unit and time information of collecting or capturing to IP(Internet Protocol)s of the each wireless terminal and IP/PORTs of the each server wherein the wireless terminals and the servers are subjects and objects for transceiving packets; a slot allocation unit for generating a timeline of the preprocessed mapped packets from collecting or capturing start time to end time and for allocating the preprocessed mapped packets to each time slot on the timeline according to collecting or capturing time; an ID assigning unit for assigning ID to each continuous section on the timeline, wherein the ID assigning unit assigning same ID if following non-empty slots exists continuously in certain error range; and a keep-alive detection unit for setting the sections assigned by the same ID on the ID assigned timeline to periodic section, identifying whether ports of packets included in the slots of the periodic section are changing or a number of the transceived packets or sizes of the transceived packets, detecting the periodic section to keep-alive periodic section if the ports are unchanged or the number of transceived packets are lower than predetermined number or the size of the transceived packets are identical from the identified results.

An aspect of the present invention, the preprocessing unit filters network control packets from the plurality of packets collected or captured by the collecting unit. The network control packets are comprising at least one of a TCP connection packet, a network disconnecting packet, a reset packet and acknowledge packet.

Another aspect of the present invention, The slot allocation unit configuring time of packet collecting or capturing by hour;minute;second;millisecond. The slot allocation unit determining a size of the time slots in predetermined time range as one of from 1 second to 60 seconds.

Another aspect of the present invention, the ID assigning unit assigning IDs to sections as continuous sections when a number of following non-empty slots exists continuously in the certain error range is more than n (n=2, 3, 4, . . . n) on the sections.

Another aspect of the present invention, the ID assigning unit a) If an empty slot exists between two time slots which packets are allocated, setting a distance n1 between the two time slots as period 1, b) determining an error range e1 (e1 is a range in 30%~60% of the period 1, or in ono of from a few seconds to tens of seconds), e) determining period 2 as a value obtained by dividing a sum of the n1 and n2 by 2, wherein the n2 is distance between two time slots when the following non-empty slots exists in the error range e1, d) resetting an error range e2 based on the new period 2, and assigning IDs to each continuous sections by repeating the processes.

Another aspect of the present invention, the polling detection unit determining the periodic sections to the polling sections when the port of the packets is continuously changing during more than a certain percentage proportion in the periodic sections.

Another aspect of the present invention, the device for detecting polling further comprising: a domain name identifying unit identifying domain names corresponding to IPs of servers which corresponds to the polling periodic sections, by using domain name tables and IPs from DNS protocol analysis.

According to another aspect of the invention, there is provided a method for detecting keep-alive packets, collecting or capturing a plurality of packets transceived between a plurality of wireless terminals and a plurality of servers through a network; processing mapping by connecting the packets collected or captured by the collection unit and time information of collecting or capturing to IP(Internet Protocol)s of the each wireless terminal and IP/PORTs of the each server wherein the wireless terminals and the servers are subjects and objects for transceiving packets; generating a timeline of the preprocessed mapped packets from collecting or capturing start time to end time; allocating the preprocessed mapped packets to each time slot on the timeline according to collecting or capturing time; assigning ID to each continuous section on the timeline; setting the sections assigned by same ID on the ID assigned timeline to periodic section; identifying whether ports of packets included in the slots of the periodic section are changing or a number of the transceived packets or sizes of the transceived packets; and detecting the periodic section to keep-alive periodic section if the ports are unchanged or the number of transceived packets are lower than predetermined number or the size of the transceived packets are identical from the identified results.

Further, the present invention includes a computer-readable recording medium for recording programs to execute each step.

BRIEF DESCRIPTION OF THE DRAWINGS

The following drawing drawings attached to the present specification illustrates an exemplary embodiment of the invention, and serves to further understand the technical idea of the invention along with a detailed description of the invention. Therefore, the invention is not limited to matters described in the drawings.

DESCRIPTION OF THE PREFERRED EMBODIMENTS

Hereinabove, although the present invention is described by specific matters such as concrete components, and the like, embodiments, and drawings, they are provided only for assisting in the entire understanding of the present invention. The specified matters and embodiments and drawings such as specific apparatus drawings of the present invention have been disclosed for illustrative purposes, but are not limited thereto, and those skilled in the art will appreciate that various modifications, additions and substitutions are possible from the disclosure in the art to which the present invention belongs. In describing exemplary embodiments of the present invention, well-known functions or constructions will not be described in detail since they may unnecessarily obscure the understanding of the present invention. Further, the terminologies specifically defined in consideration of the configuration and functions of the present invention may be construed in different ways by the intention of users and operators. Therefore, the definitions thereof should be construed based on the contents throughout the specification. Therefore, the definitions thereof should be construed based on the contents throughout the specification.

It will be apparent to those skilled in the art that substitutions, modifications and variations can be made without departing from the spirit and scope of the invention as defined by the appended claims and can also belong to the scope of the invention.

Figure 1:
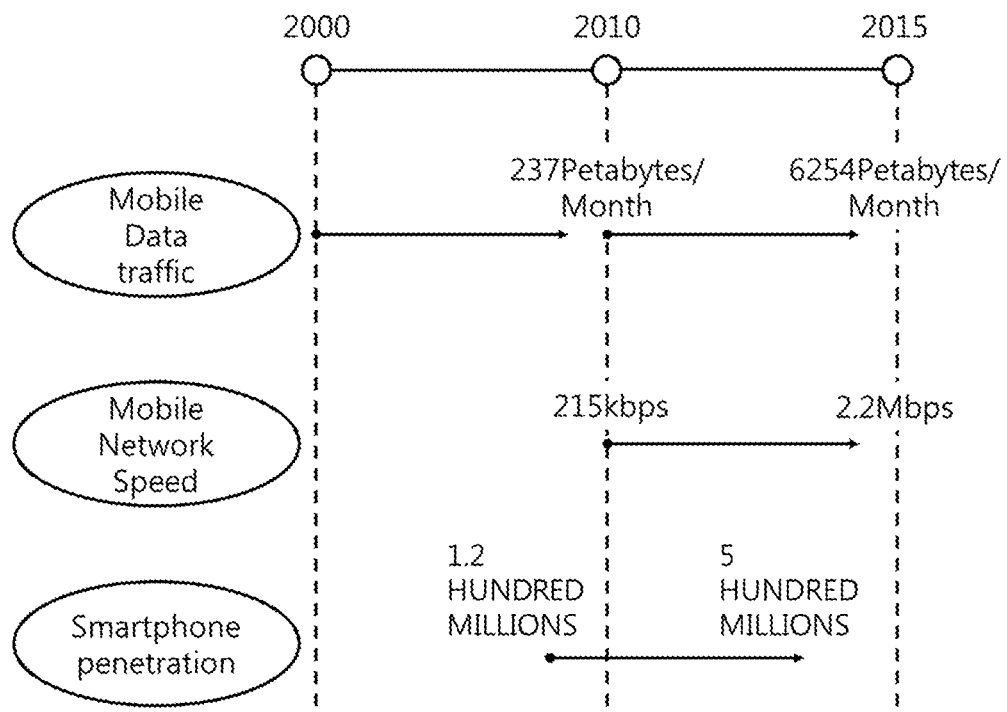
FIG. 1 shows mobile (wireless) data traffic indexes.
Figure 2:
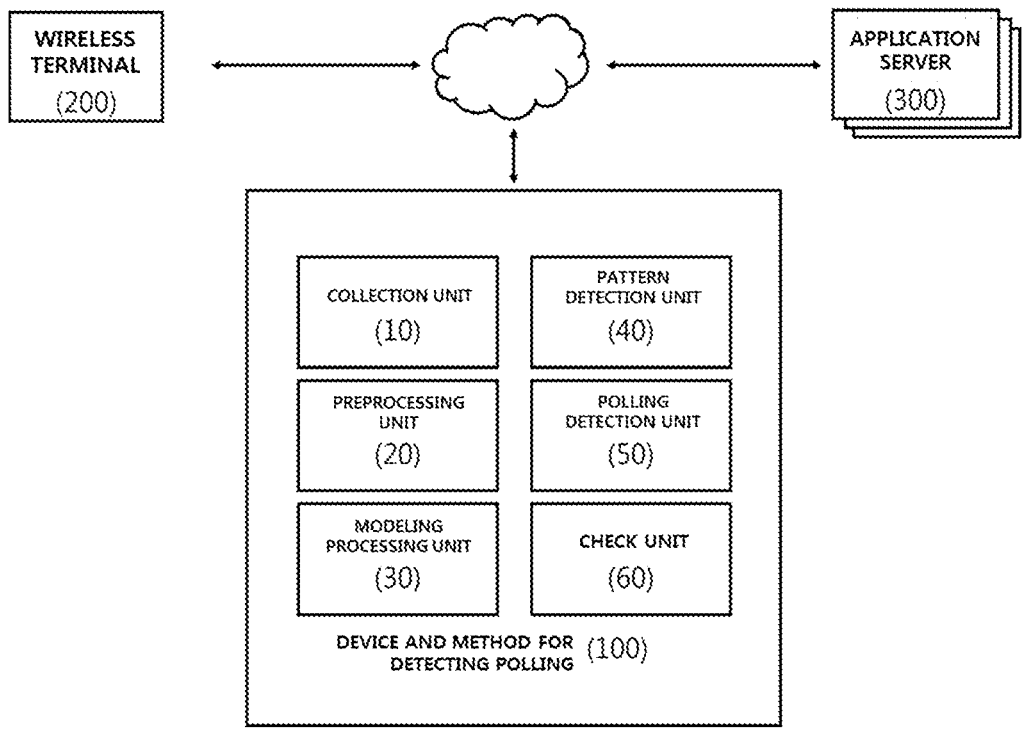
FIG. 2 shows the main units for a device for detecting keep-alive according to an embodiment of the present invention.

FIG. 2 shows the main configuration unit for a device 100 for detecting periodicity according to an embodiment of the present invention.

In more detail, FIG. 2 shows that a plurality of wireless terminals 200 and servers 300 are connected to a communication network or a network for transceiving packets, and shows the configurations for detecting the keep-alive periodicity after collecting and capturing the packets.

Each configuration shown in FIG. 2 is the configuration for describing an embodiment of the present invention, but the present invention is not limited to technical characteristics of the embodiment shown in FIG. 2.

According to an aspect of the invention, the device 100 for detecting keep-alive collects or captures a plurality of packets mutually transceiving between a plurality of wireless terminals 200 and servers 300 through the network, maps the collected or captured packets and packet collection or capture time information to the subject and the object of transceiving each packet, that is, each wireless terminals 200 IP and servers 300 IP/PORT by connecting them, generating a timeline from collection or capturing start time to end time for the mapped packets, maps the mapped packets to each time slot on the timeline according to collection or capturing time information, assigns IDs to each continuous sections on the timeline, sets sections which are assigned to same ID on the ID assigned timeline to periodic sections, identifies ports of packets in slots present on the periodic sections, determines the periodic sections to keep-alive periodic sections if the ports are unchanged(or unvaried), a number of the packets is lower than a predetermined number, or sizes of the packets are identical.

Referring to FIG. 2, the device 100 for detecting keep-alive periodicity in the embodiment of the present invention includes a collection unit 10, a preprocessing unit 20, a slot allocation unit 30, ID assigning unit 40, a keep-alive detection unit 50, and a check unit 60.

The device 100 for detecting keep-alive periodicity is shown as a single device in the drawing for the description of the embodiments, but each configuration may be separated into at least one device or server.

Referring to FIG. 2, the collection unit 10 collects or captures a plurality of packets for mutually transceiving between a plurality of wireless terminals 200 and servers 300 through the communication network.

When the wireless terminals 200 communicate with the servers 300 (for game, web, chatting and YouTube) in the embodiment of the present invention, packets produced from the wireless terminals 200 are converted into TCP/IP protocol and therefore transferred to the corresponding server 300 while passing network processing apparatuses such as GGSN (Gateway GPRS Support Node) or P-Gateway. Since the packets should be analyzed without causing communication problems between the wireless terminals 200 and the servers 300, the collection unit 10 duplicates the packets and it is desirable that the duplicated packets are transferred to the preprocessing unit 20. Further, communication equipments to be described below are modified for in-line processing.

The preprocessing unit 20 of the present invention connects the packets and packet collection or capture time information collected or captured by the collection unit 10 to the subject and the object of transceiving each packet, that is, each wireless terminals 200 IP and servers 300 IP/PORT and maps the connected them.

The packets transceiving between the wireless terminals 200 and servers 300 in the communication network are mixed in the packets communicating between a plurality of the wireless terminals 200 and servers 300, and therefore the packets should be firstly classified for each wireless terminals 200 communicating with the servers 300 to grasp the periodicity between the packets transceiving between a specific wireless terminal 200 and a specific server 300. Therefore, the preprocessing unit 20 maps the packets and packet collection or capture time information collected or captured by the collection unit 10 to the subject and the object of transceiving each packet, that is, each wireless terminals 200 IP and servers 300 IP/PORT by connecting them.

FIG. 3 to FIG. 6 shows a mapping process performed by each wireless terminals 200 IP and servers 300 IP/PORT in the preprocessing unit 20.

Figure 3:
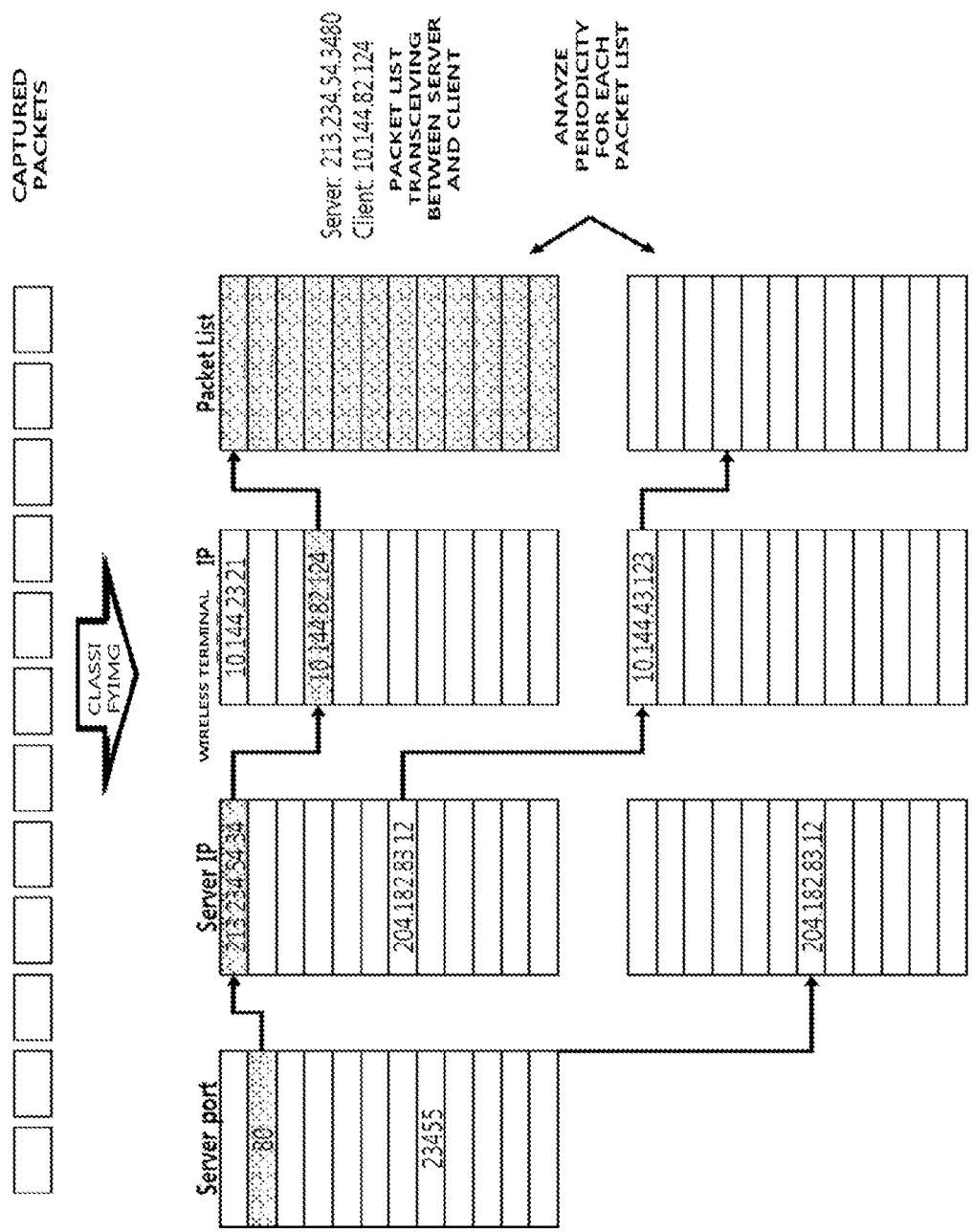
FIG. 3 shows one embodiment showing one of preprocessing processes according to an embodiment of the present invention.

FIG. 3 shows that the preprocessing unit 20 connects the packets collected or captured by the collection unit 10 to the subject and the object of transceiving each packet, that is, each wireless terminals 200 IP and servers 300 IP/PORT and maps the connected them.

Figure 4:
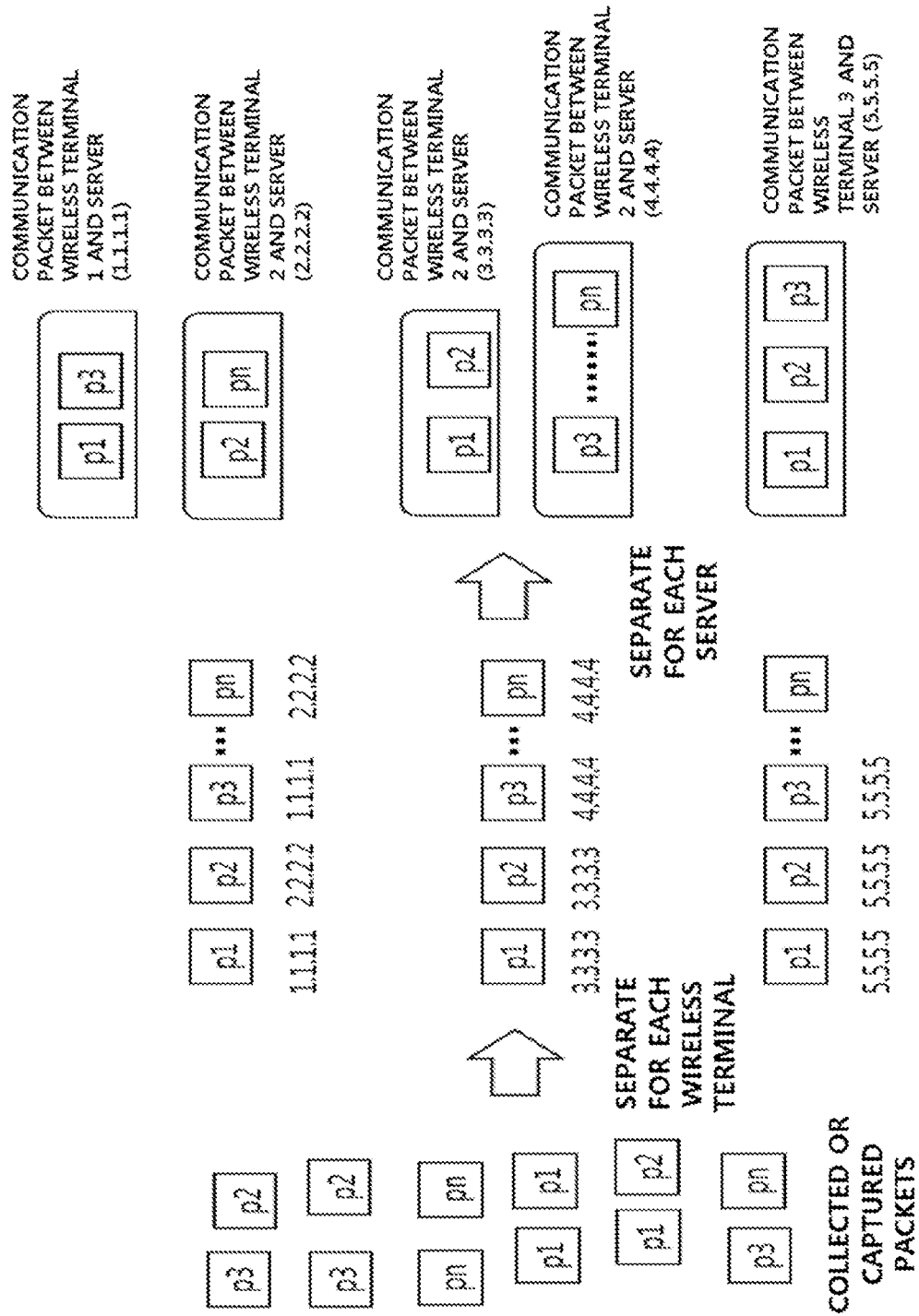
FIG. 4 shows one embodiment showing one of preprocessing processes according to an embodiment of the present invention.

In FIG. 4, in order to classify the packets transceiving between a plurality of wireless terminals 200 and servers 300 for each specific wireless terminals 200 and servers 300 communicating with the specific wireless terminals 200, the preprocessing unit 20 may firstly classify a plurality of packets for each IP of the wireless terminals 200 and secondly classify each packet for each servers 300, using IP/PORT of packet source and IP/PORT of destination written in the packets, to send the packets from the specific wireless terminals 200 to the servers 300.

For example, on sending the packets from the wireless terminals 200 IP 1.1.1.1/PORT 10 to the servers IP 2.2.2.2/PORT 20, 1.1.1.1 is written in source field of IP header of the packets, and 2.2.2.2 is written in destination field. Similarly, when 10 is written in the source of TCP (or UDP) header, 20 is written in the destination, the source and destination are written in the packets, and the packets are transferred to various routers or switches, the packets are transferred to another routers or switches while referencing the corresponding fields of the packets and it is possible to classify whether from where do these packets come from to where are these packets going on analyzing these fields.

Figure 5:
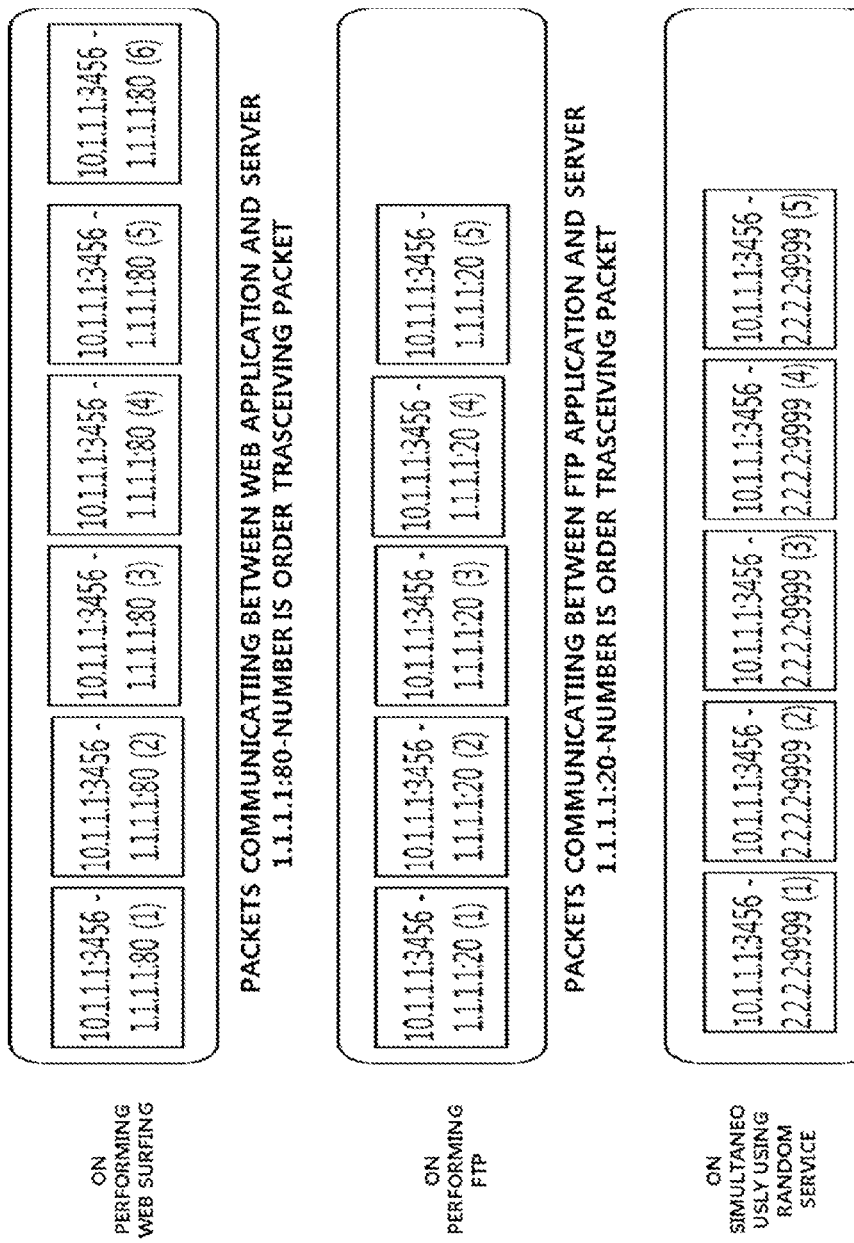
FIG. 5 shows one embodiment showing one of preprocessing processes according to an embodiment of the present invention.
Figure 6:
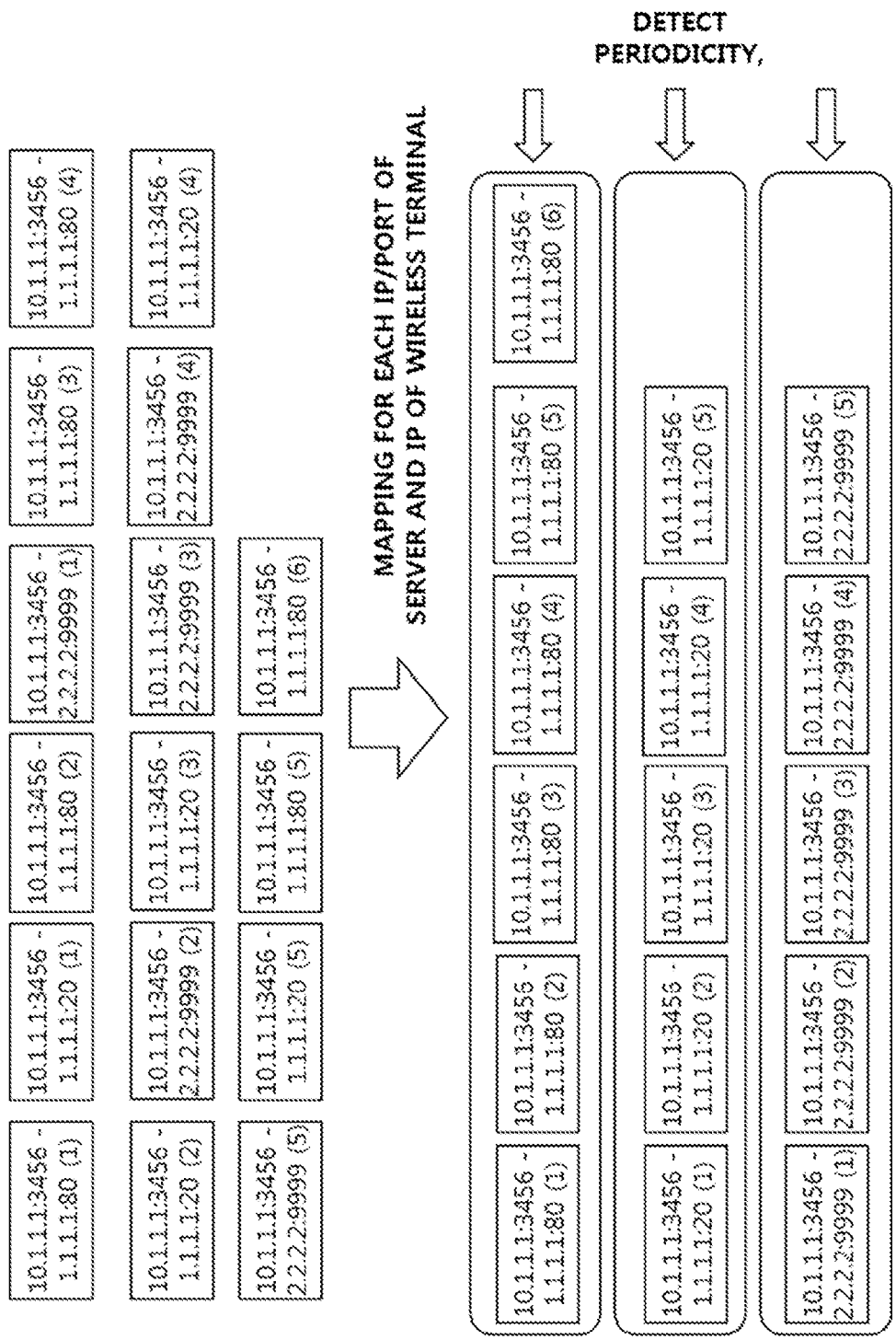
FIG. 6 shows one embodiment showing one of preprocessing processes according to an embodiment of the present invention.

The packets shown in FIG. 5 are produced, on assuming communication with [80 PORT of 1.1.1.1 server 300], [20 PORT of 1.1.1.1 server 300], [9999 PORT of 2.2.2.2 server 300] at random wireless terminals 200[10.1.1.1], on classifying for each PORT of the servers 300 (The ports of the wireless terminals 200 are randomly designated on connecting the network to the specific port of the server 300, and is randomly designated as 3456 in FIG. 5 because the connection never changes as long as it is connected).

The specific applications at the wireless terminals 200 are connected to a plurality of servers 300 to perform each processor. At this time, the packets to be used pass base stations, pass the network processing apparatus such as GGSN or P-gateway, and are dispersed as a top drawing shown in FIG. 6 on collecting or capturing the packets at the collection unit. Therefore, the preprocessing unit 20 classifies these packets for each the IP and PORT as a bottom drawing shown in FIG. 6 and therefore these packets may be produced as an original structure.

Further, the preprocessing unit 20 may classify the packets collected or captured by the collection unit for each IP/PORT of the servers 300 and IP of the wireless terminals 200. To this end, it must know whether which address is the IP of the servers 300 and is the IP of the wireless terminals 200. Therefore, the preprocessing unit 20 may check whether which one of Source IP or Destination IP of the packets is the wireless terminals 200 IP and may determine whether which one of Source IP or Destination IP of the packets is the servers 300 IP by band information of the wireless terminals 200 IP at a wireless network to be analyzed.

Further, in the present invention, the preprocessing unit 20 filters network control packets of a plurality of packets to be collected or captured by the collection unit 10 and further excludes the filtered control packets.

In this case, the network control packets may include at least one of TCP connection packets, network connection termination packets, resetting packets, and acknowledgement packets.

Figure 7:
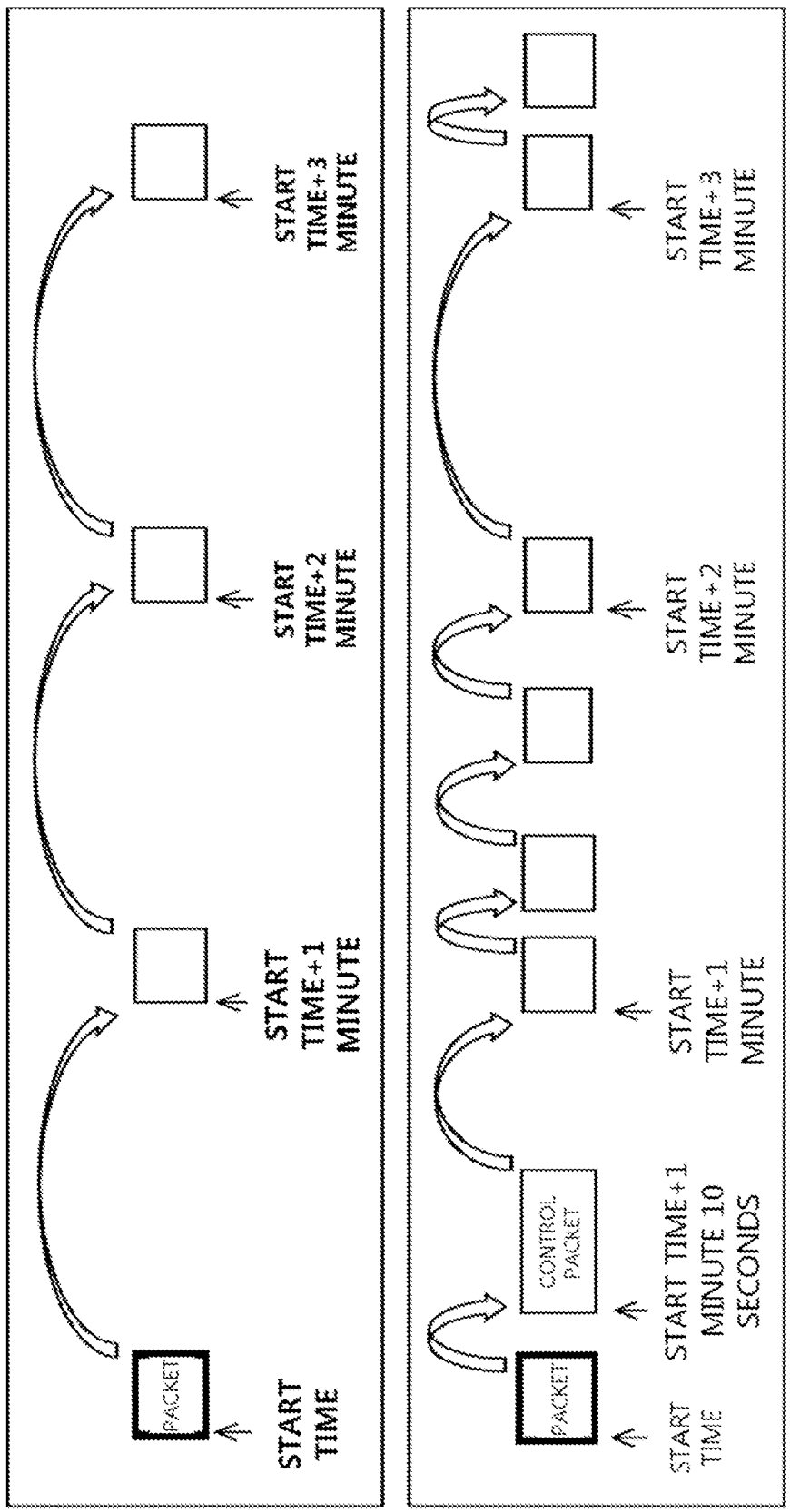
FIG. 7 shows one embodiment showing an example of filtering control packets according to an embodiment of the present invention.

FIG. 7 shows that the control packets are included in the packets collected or captured by the collection unit 10.

Figure 8:
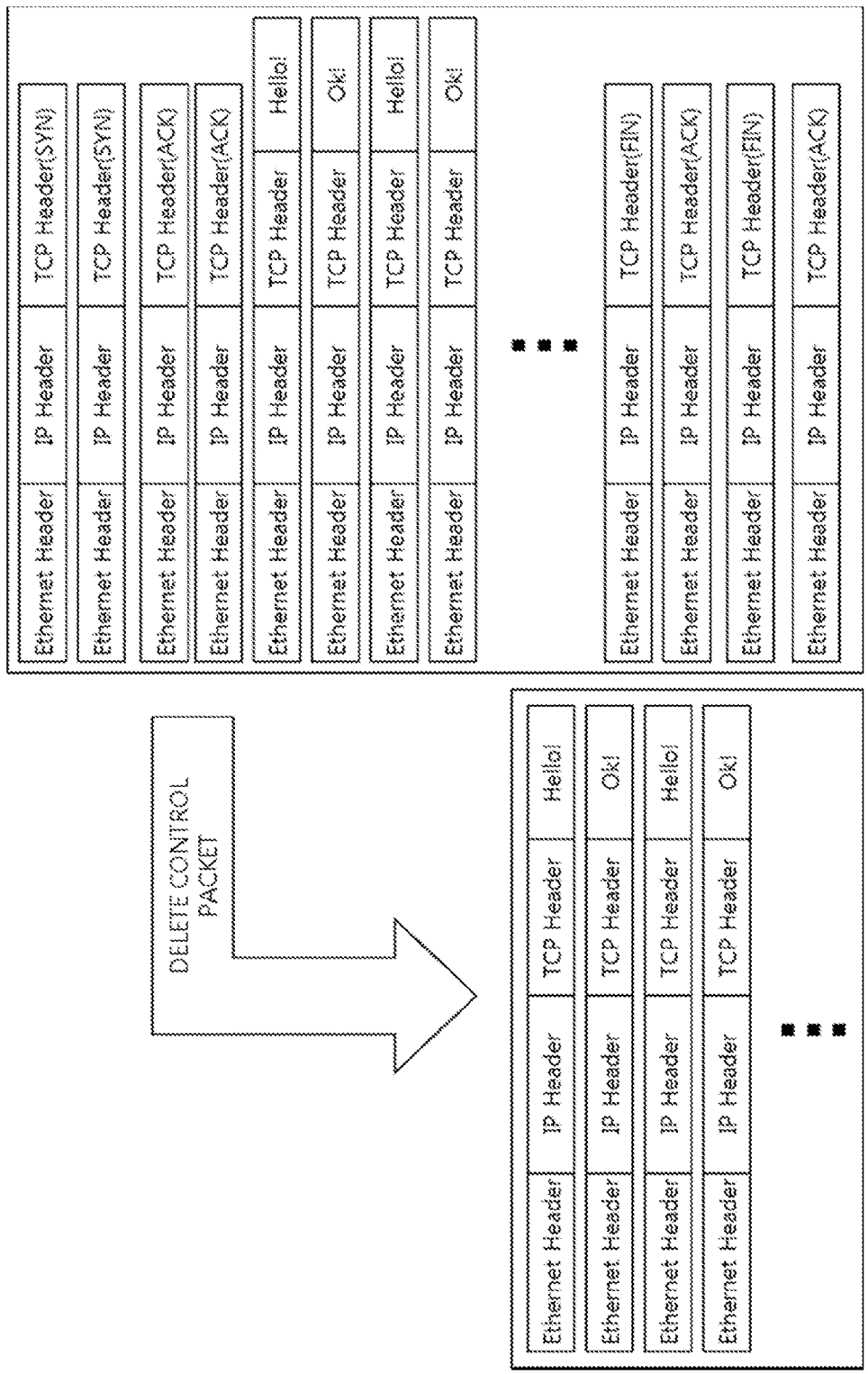
FIG. 8 shows one embodiment showing an example of filtering the control packets according to an embodiment of the present invention.

That is, on assuming that the specific applications produces Keep Alive messages at 1 minute intervals, the wireless terminals 200 is ideally communicated with the servers 300 as patterns such as the top drawing shown in FIG. 8, but various control packets are really mixed, according to the state of the communication network, as the bottom drawing shown in FIG. 7. In this state, because it may not grasp periods of the packets directly sending from the wireless terminals 200 to the servers 300 by collection or capture time of the packets, the preprocessing unit 20 removes all the control packets such that the packets only, that the wireless terminals 200 really requests to the servers 300 and transceiver from/to them, remain.

Figure 9:
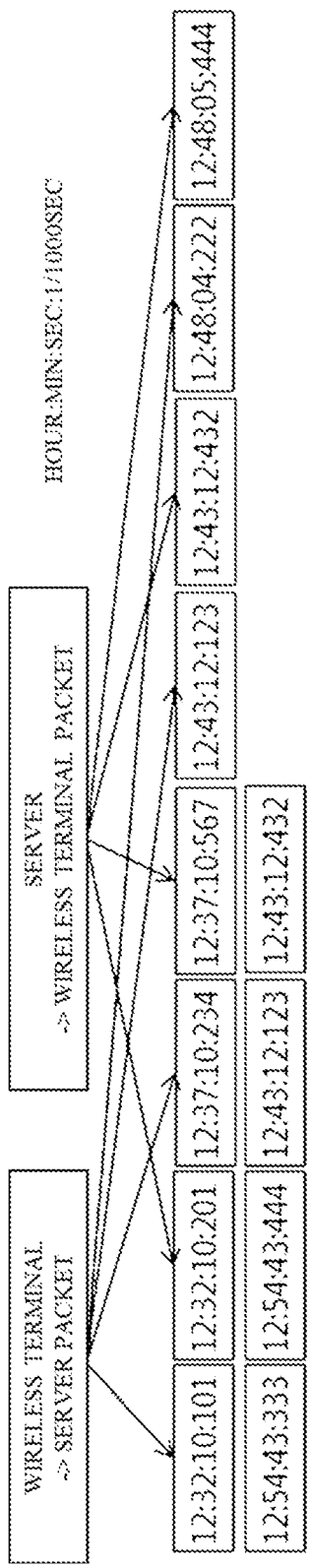
FIG. 9 shows one embodiment showing one of preprocessing processes according to an embodiment of the present invention.

In an example shown in FIG. 8, when the preprocessing unit 20 filters the control packets, the specific wireless terminal 200 firstly sends "hello!" and receives "ok!" at 5 minutes intervals on connecting to the specific server 300 and all the packets that use to send "hello!" and receive "ok!" have a state before removing the control packets shown in FIG. 9.

That is, referring to FIG. 8, when a user merely sends "hello!" and receive "ok!", the packets are used for connection setting SYN, ACK and connection termination FIN, ACK. When the packets are midway lost, various control packets such as the packets for requesting retransmission and for connecting again are interposed midway, wherein because these packets are irrespective of periodicity detection, the preprocessing unit 20 removes all the control packets.

In order to know whether the packets are the control packets, the preprocessing unit 20 may determine the packets having no contents as the control packets.

According to one embodiment the present invention, the slot allocation unit 30 generates timeline of the mapped packets from packet collection or capturing start time to end time, and maps the mapped packets to each time slot on the timeline according to collection or capturing time.

In the present invention, the a lot allocation unit 30 may set the collection or capturing time in hour/minute/second/millisecond, and may assign a size of the each slot in 1 second to 60 seconds range.

FIG. 9 to FIG. 14 shows embodiments for generating the timeline and mapping the time slots of the slot allocation unit 30.

Figure 10:
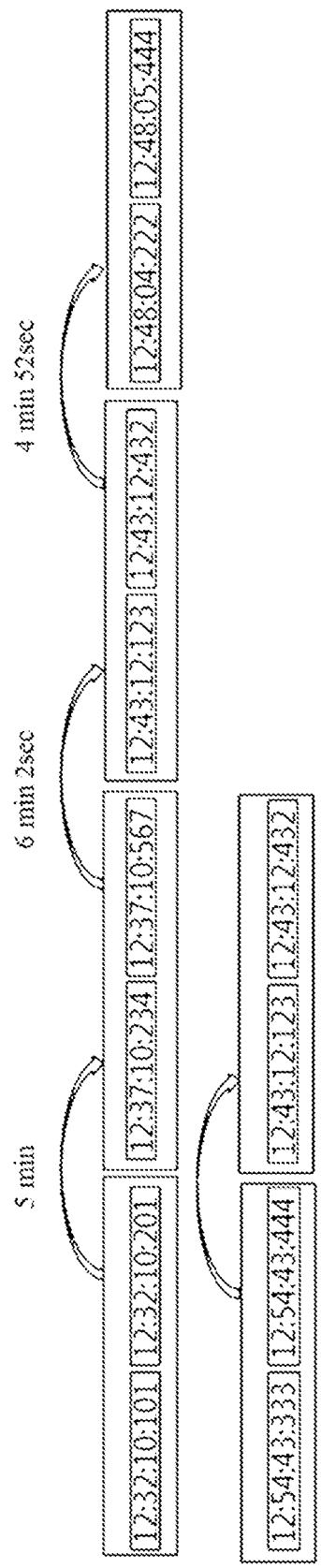
FIG. 10 shows one embodiment showing a process of generating a timeline and allocating time slots according to the present invention.

First of all, if the wireless terminal 200 generates a keep alive packets at the same time as shown in FIG. 10 for maintaining connection to the server 300, the wireless terminal 200 send a packet to the server 300 at 12:32:10:101 and received a packet in response at 12:32:10:201 (100 ms required between requesting of wireless terminal 200 and responding of the server 300), and send a packet to the server 300 at 12:37:234 and received a packet in response at 12:37:567.

In this way, the wireless terminal 200 sends packets in about 5 minutes interval period. If the network is not very bad, the wireless terminal 200 receives packets in response within a few tens of milliseconds~a few hundreds of milliseconds because the packets having small size, and the wireless terminal 200 performs sending and receiving after certain time from receiving the packet in response.

When the wireless terminal 200 is repeatedly operating for sending and receiving packets in regular interval and a unit of requesting and responding is defined as one event, a range of one event needs to be defined, and if one event is assumed as in case an interval between one packet and next packet is lower than a few seconds, the packets can be distinguished and there are regular intervals between each packets because the response time is commonly lower than a few hundreds millisecond as shown in FIG. 10.

The device 100 for detecting keep-alive of present invention is to distinguish each event and detect events that having a constant time interval.

The device 100 for detecting keep-alive of present invention, firstly determines whether events are periodic, and it determines whether ports of packets in sections of the each event are varied or whether a number of transceiving packets or a size of the packets is in constant, and determines whether the packets are polling periodic, keep-alive periodic or simple periodic.

Figure 11:
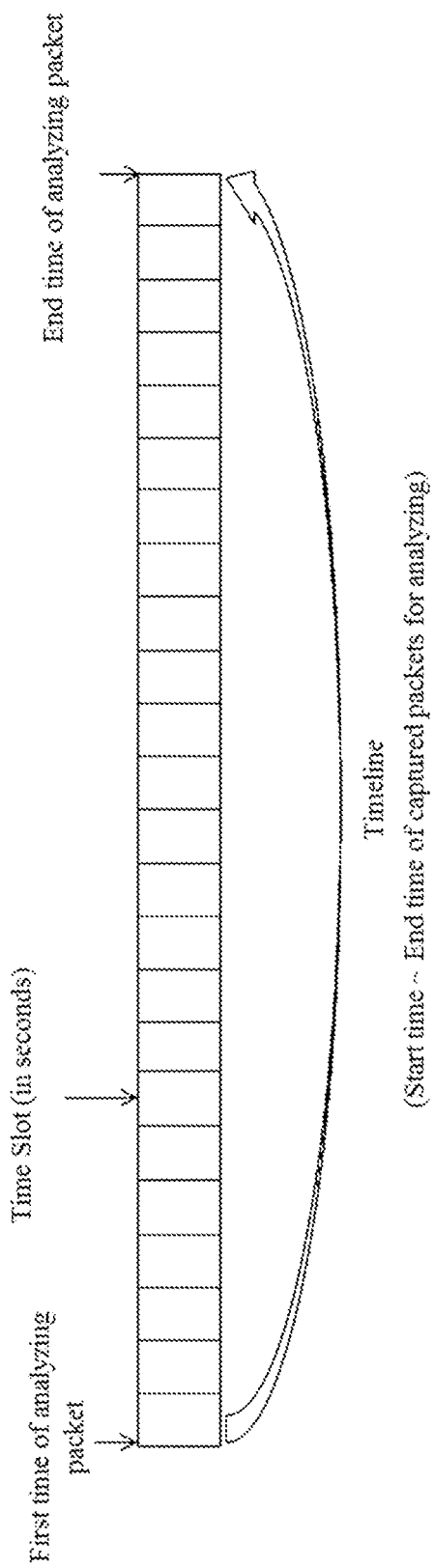
FIG. 11 shows one embodiment showing a process of generating a timeline and allocating time slots according to the present invention.

FIG. 10 represents patterns of keep alive packet, the patterns is not just as shown in FIG. 11 of requesting from wireless terminal 200->to server 300, but there can be many cases as from wireless terminal 200->to server 300 only or from server 300->to wireless terminal 200 only, etc. In any case, capturing time of packets can be recorded in a slot or adjacent slot of one event, the packets can be allocated to time slots of predetermined size according to capturing time, then the sections of the timeline having the events may be stick together, and other sections may be empty.

Further, time intervals between sections having events in stick together can be analyzed, and the sections can be set to periodic if the time intervals between events are constant, or the sections can be set to non-periodic in the time intervals are not constant.

FIG. 11 shows embodiments of generating a timeline having a predetermined slot size (in seconds) for grouping packets on time at the events generated and of mapping the packets that the control packets are deleted by the preprocessing unit 20 to each slot according to capturing time.

Figure 12:
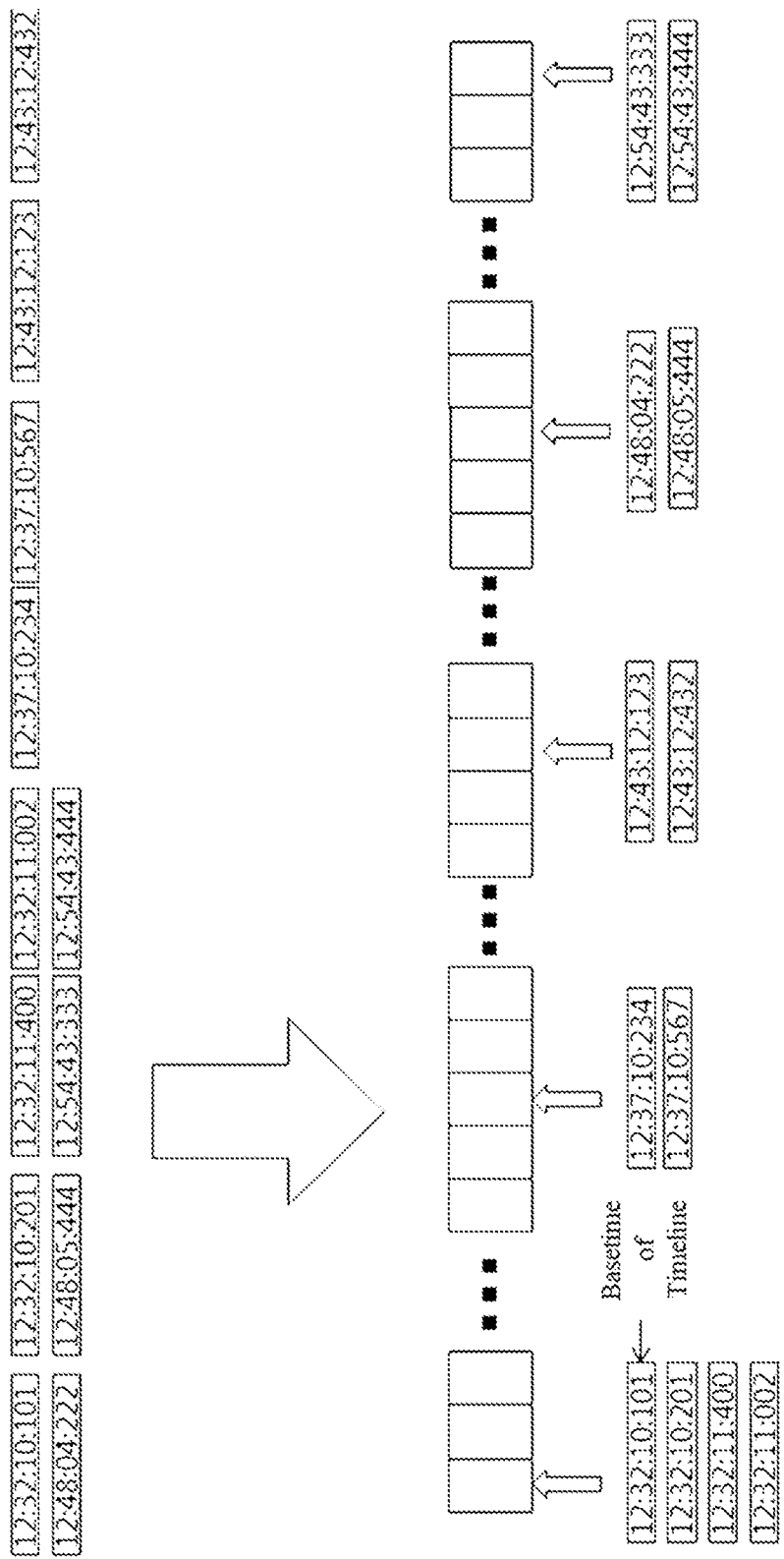
FIG. 12 shows one embodiment showing a process of generating a timeline and allocating time slots according to the present invention.

FIG. 12 shows embodiments of mapping the packets collected or captured on certain time to the timeline that the size of time slots is 2 seconds.

As shown in FIG. 12, a relative position based on the first packet time can be calculated and allocated. That is, the size of the slot inserted by packets can be calculated as (start time of the packets to insert–the first packet: base time)/slot size.

For example, when the "12:43:12" packet is inserted to a slot, the packet can be inserted to the 331th slot by calculating (12:43:12–12:32:10)/2 seconds=331.

That is, if the wireless terminal 200 allocates an event of sending packets to server 300 at 12:32:10:101 and receiving packets in response at 12:32:10:201, 12:32:11:400 and 12:32:11:002 to a time slot on the timeline from the base time, the time slot of the event for sending the packets to the server 300 at 12:43:12:123 and receiving packets in response at 12:43:12:432 can be the 331th time slot from the base time that is value of dividing a difference between 12:43:12 and 12:32:10 as base time by 2 seconds as the time slot's size.

Figure 13:
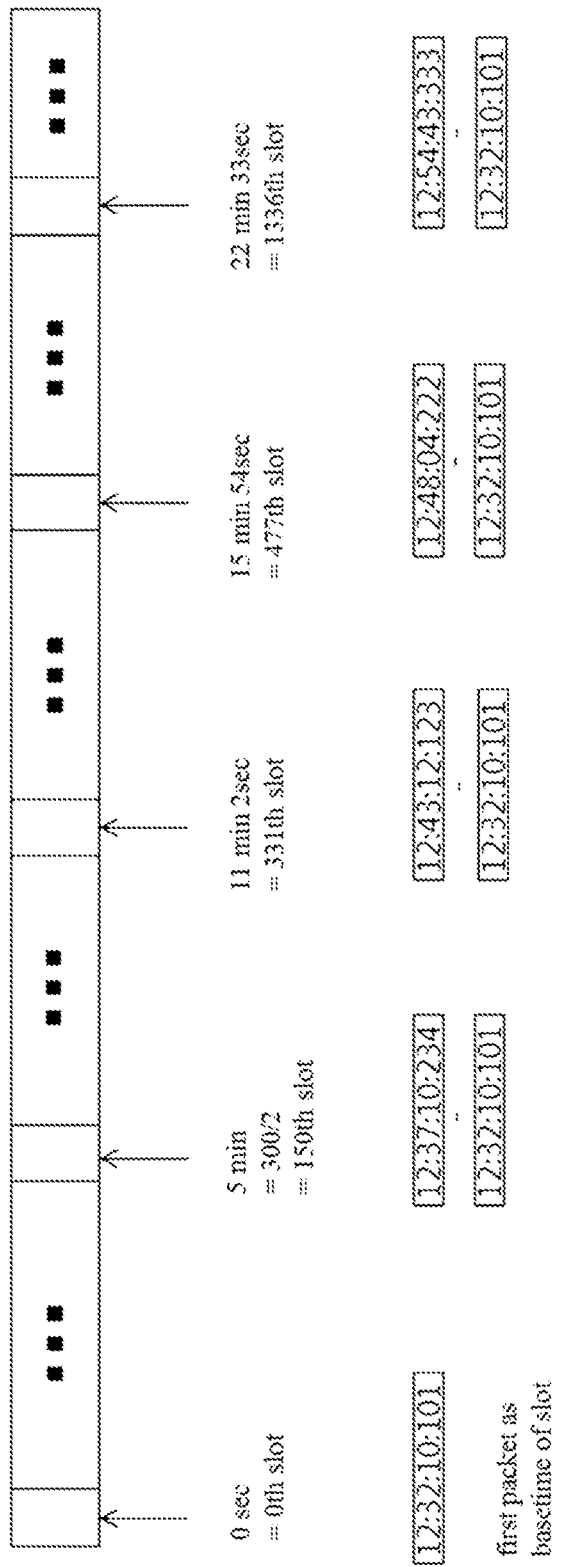
FIG. 13 shows one embodiment showing a process of generating a timeline and allocating time slots according to the present invention.

After processing as shown in FIG. 12, the timeline allocated by time slots as shown in FIG. 13 can be generated.

In this manner, when the slot allocation unit 30 determines the size of a time slot and maps the packets to the time slots according to generated time, packets generated in similar time can be positioned in a same slot or adjacent slots as shown in FIG. 13, then it becomes easy to determine periodicity because almost of all packets like keep alive or polling that requiring immediate response can be positioned in same slot or in adjacent slots as request and response. (if not, it is difficult to distinguish whether an individual request or response of one request)

Figure 14:
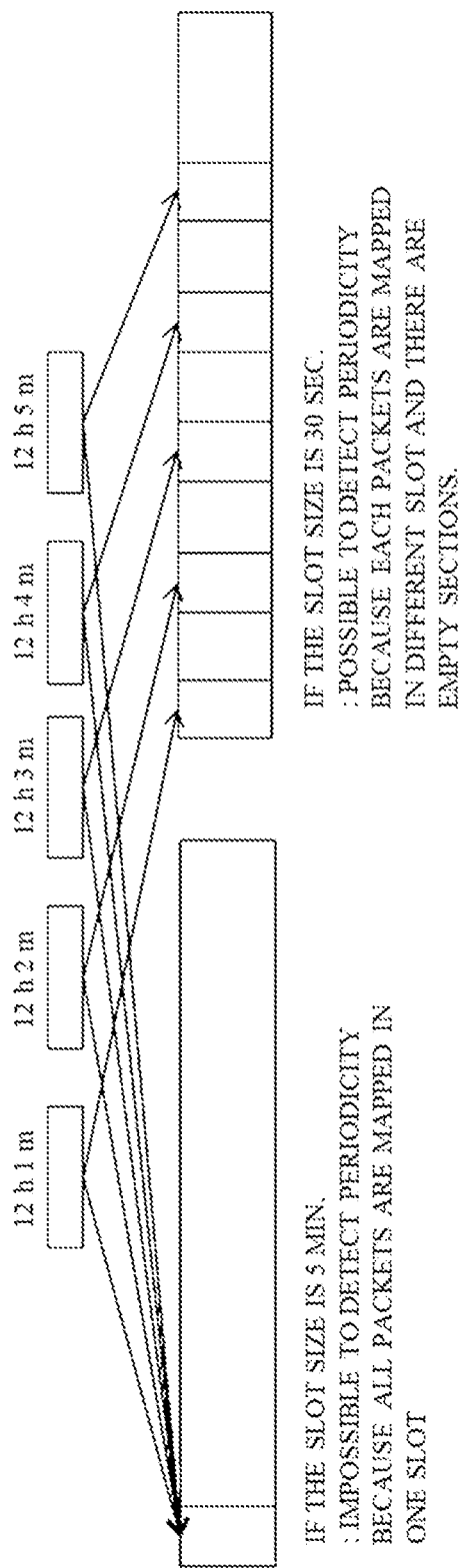
FIG. 14 shows one embodiment showing a process of generating a timeline and allocating time slots according to the present invention.

FIG. 14 shows the reason of allocating the size of the time slot by the slot allocation unit 30 for one size in range from 1 second to 60 seconds. If the size of the time slots defined as 5 minutes and packets are generated 5 times in 1 minute interval, all the packets are allocated in one slot and it is impossible to detect periodicity. Thus, if the slots are generated in a few second to tens of seconds, it becomes easy to detect periodicity because all the packets can be allocated to each different slot.

ID assigning unit 40 in one embodiment of present invention, processes for assigning ID(identification)s to each continuous sections on the timeline, and assigning same ID to the slots if the next slot of the slot is present continuously in an error range.

According to the present invention, the ID assigning unit 40 can assign an ID to a section as continuous section if the section having, a number of cases that the next time slot is non-empty in an error range, is more than n (n=2, 3, 4, . . . n). If there is an empty slot between two time slots allocated packets, the error range can be one of in a certain percentage of interval between the two time slots or in a few second to tens of seconds.

FIG. 15 to FIG. 19 shows embodiments for assigning IDs on the timeline by the ID assigning unit 40.

Figure 15:
FIG. 15 shows one embodiment showing a process of generating a timeline and allocating time slots according to the present invention.

Describing ID assigning processes of ID assigning unit 40 by FIG. 15, firstly the slot allocation unit 30 generates a timeline and allocating time slots on the timeline to insert packets, then the time slots can be empty or non-empty as shown in FIG. 15 if the packets are generated periodically.

In this, because there's a chance that a response packet corresponding to a send packet may be inserted in another adjacent time slot, not in the same time slot (b of FIG. 15), non-empty and adjacent time slots may be calculated as one time slot.

And first, as shown as empty time slots between a and b in FIG. 15, periodicity can be 10 seconds because there are 5 empty slots and the size of the slots is 2 seconds.

In this case, next periodicity can be expected as 10 seconds, and a next packet need to be present in range of from (10 seconds−5 seconds) to (10 seconds+−5 seconds) if the error range of the position of the next packet is 50% of the periodicity, FIG. 15 shows that 14 seconds corresponding to the number of empty slots (7 slots*2 seconds) from b to c as next packet satisfies in the error range.

As if the next packet is identified in the error range, the periodicity can be recalculated by accumulating, and if the error range is recalculated by the accumulated periodicity of 12 seconds as (10 seconds for first periodicity+newly identified periodicity 14 seconds)/2, then a next packet need to be present in (12 seconds−6 seconds) to (12 seconds+−6 seconds) range as 6 seconds~18 seconds, empty slots in section (c-d) are in 10 seconds(5 slots*2 seconds) in the recalculated range.

After that, (12 seconds+10 seconds)/2=11 seconds can be recalculated as the accumulated periodicity.

As doing so, the ID assigning unit 40 can process assigning same IDs to slots if the slots appear continuously as non-empty in the error range.

Figure 16:
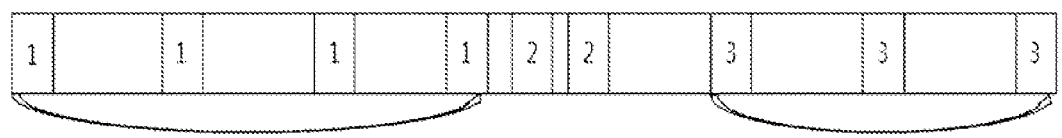
FIG. 16 shows one embodiment showing a process of generating a timeline and allocating time slots according to the present invention.

If next periodicity is not found in the error range, an ID can be increased by 1 and a periodicity is recalculated from next slot found having different periodicity, then the processes repeated can make assign an ID to similar sections as shown in FIG. 16.

Referring to FIG. 16, the ID assigning unit 40 can combine IDs having similar periodicity after the ID assigning unit 40 assigns the ID. In this case, 1st and 3rd IDs can be combined because of similar periodicity, and the device 100 for detecting keep-alive can determine if a length of the combined region is more than a length of a predetermined percentage of the total time line.

In this case, the ID assigning unit 40 finds next periodicity for combining by sorting periodicities in ascending order when a periodicity of ID 1 is 20 seconds, a periodicity of ID2 is 10 seconds and a periodicity of ID3 is 21 seconds.

For sorting in ascending order and combining ID2: 10 seconds, ID1: 20 seconds, ID3: 18 seconds, first, a range of periodicity possibly combined for current periodicity as 10 seconds is from 10 seconds to 5 seconds-15 seconds in the error range 50%, and ID1 and ID2 may not be combined because both are not in expected range, then the periodicity of ID 1 as 20 seconds becomes to 10 seconds~30 seconds in the error range 50%, thus ID1 and ID3 can be combined because ID3 is in the range (a new periodicity is (20+18)/2=19 seconds.

In contrary, for sorting in descending order and combining ID1: 20 seconds, ID3: 18 seconds, ID2: 10 seconds, ID3 can be combined because the periodicity of ID3 is in 10 seconds~30 seconds as the error range 50% for periodicity of ID1(20 seconds). In this case, a new periodicity can be 19 seconds as (20+18)2, and if applying the error range 50% for the 19 seconds, there is a problem that ID2 also can be combined because the range of the periodicity becomes to 8 seconds~27 seconds.

Thus, for sorting in descending order, if a periodicity is bigger, an error range is larger and periodicities having big difference may be combined. Therefore it is preferable for sorting in ascending order and combining similar periodicity of IDs having small periodicity with priority.

Figure 17:
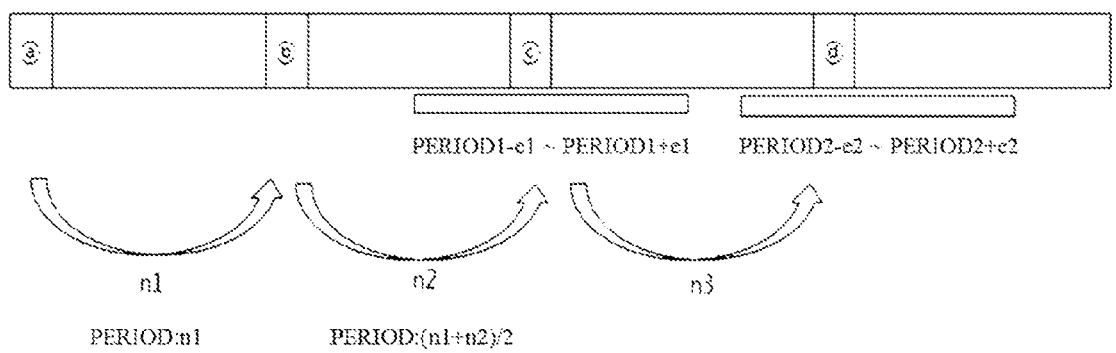
FIG. 17 shows one embodiment showing a process of generating a timeline and allocating time slots according to the present invention.
Figure 18:
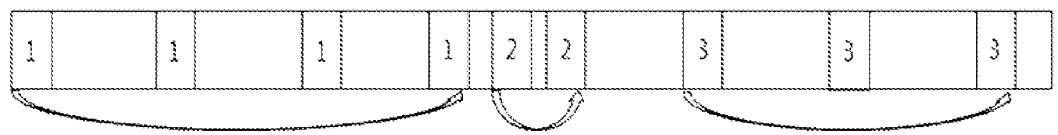
FIG. 18 shows one embodiment showing a process of generating a timeline and allocating time slots according to the present invention.

FIG. 17 shows ID assigning unit 40 assigning ID on the timeline.

First, if there is an empty slot between two slots(ⓐ-ⓑ), an expected position of the next packet present in period1−e1~period1+e1 when the difference between two slots n1 is defined as period1 and the error range is defined as e1 (in predetermined percentage of period1 or defined as absolute value like a few seconds or a few minutes)

If next non-empty slot(ⓒ) is in the error range, new period2 becomes (n1+n2)/2 and IDs for each continuous sections can be assigned by reconfiguring the error range based on the new period2, and repeating above processes.

Figure 19:
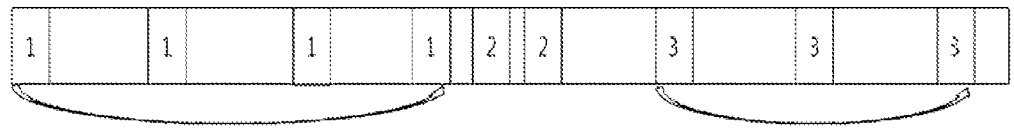
FIG. 19 shows one embodiment showing a process of generating a timeline and allocating time slots according to the present invention.

Thus, the ID assigning unit 40 continuously assigns the same ID to the identified non-empty next slot in the error range, repeatedly increases ID when non-empty slot is not found in the error range, then the sections in similar can be assigned an ID a grouped together as shown in FIG. 19.

FIG. 19 shows an embodiment for the ID assigning unit 40 to combine similar periods.

The process for combining similar periods and considering them as same periodicity is required because it is nearly impossible to detect same period even if same periodicity is in real data.

As shown in FIG. 19, if the periodicity of the section detected for ID1 is 2 minutes, ID2 is 30 seconds and ID3 is 2 minutes 20 seconds, periodicity information can be collected as (ID1, 2 minutes) (ID2, 30 seconds) (ID3, 2 minutes 20 seconds), they are sorted in ascending order as (ID2, 30 seconds) (ID1, 2 minutes) (ID3, 2 minutes 20 seconds), then they can be sequentially combined by checking that next item is in the error range of current item.

That is, when the periodicity of ID2 is 30 seconds and the error range is 50%, the similar range needs to be in 30−15 seconds~30+15 seconds. Then item is moved to ID1 as next item because ID1 is having not similar periodicity and it is not in the error range. When the periodicity of ID1 is 2 minutes and the error range is 50%, similar periodicity range needs to be in 2−1 minutes~2+1 minutes. Then ID3 can be combined with ID2 having a similar periodicity, wherein the periodicity can be recalculated and configured to 2 minutes 10 seconds by (2 minutes+2 minutes 20 seconds)/2, all similar periods can be combined by doing this manner.

Keep-alive detection unit 50 of one embodiment of present invention, sets periodic sections which are assigned to a same ID on the timeline that assigned IDs by the ID assigning unit 40, identifies variation of the ports of packets in the slots on the periodic sections is present, or a number of the packets, or sizes of the packets, and if the identified results indicate that the ports are unchanged, a number of the packets is lower than a predetermined number, or sizes of the packets is constant, then detecting the periodic sections to keep-alive periodicity sections.

According to the present invention, the keep-alive detection unit 50, can detect the periodic sections to keep-alive periodicity sections if the proportion ratio or the number of the sections assigned same ID is more than a predetermined ratio or a predetermined number.

That is, the keep-alive detection unit 50, for packets in slots present on sections identified to periodic (ID1, ID3) as in FIG. 19, if the ports of the packets corresponding to the wireless terminal 200 are continuously unchanged, or if the number of packets are lower than n, or if the sizes of the packets are identical, detects the sections as Keep-alive periodicity section.

As shown in FIG. 19, if ID1 and ID3 are considered as same ID by ID assigning unit 40, a proportion ratio percentage of the both region can be calculated, a probability of being periodicity can be determined higher when the proportion ratio is higher, thus the probability of being periodicity can be expected higher when the number of continuous calculation is increased by ID assigning unit 40 while calculating next expected period continuously.

Figure 20:
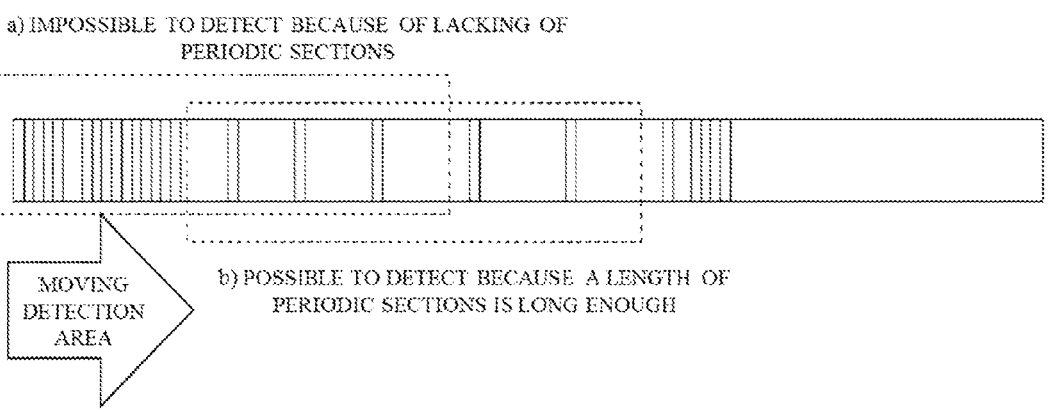
FIG. 20 shows one embodiment showing a process of generating a timeline and allocating time slots according to the present invention.

FIG. 20 shows detecting of keep-alive detection unit 50 when there are periodic sections and non-periodic sections, if the collected data is long enough and sections for detection is configured to be smaller than total collected base, further periodicity detections can be possible by moving the timeline for detecting as shown in FIG. 20.

The check unit 60 in the present invention, processes, by using IPs and domain name tables from analyzing DNS (Domain Name System) protocol, identifies domain names corresponding to IPs of the servers 300 of the keep-alive periodicity sections.

That is, because the keep-alive detection unit 50 finally detects whether periodic to IP, PORT of a specific server 300 and detects information about the length of the period but it cannot be known that the specific server 300 is which server 300, the specific server 300 need to be specified by identifying domain name information from DNS protocol analysis for obtaining further information of the specific server 300.

For example, if the server 300 as 1.1.1.1:80 is detected as being periodic and the IP is identified as www.naver.com corresponding to the DNS table, the server 300 can be expected to providing naver services.

In the present invention, the entire or some function of configurations included in the device 100 for detecting keep-alive periodicity may be implemented by a program or program set, and each configuration may include at least one servers or devices.

Figure 21:
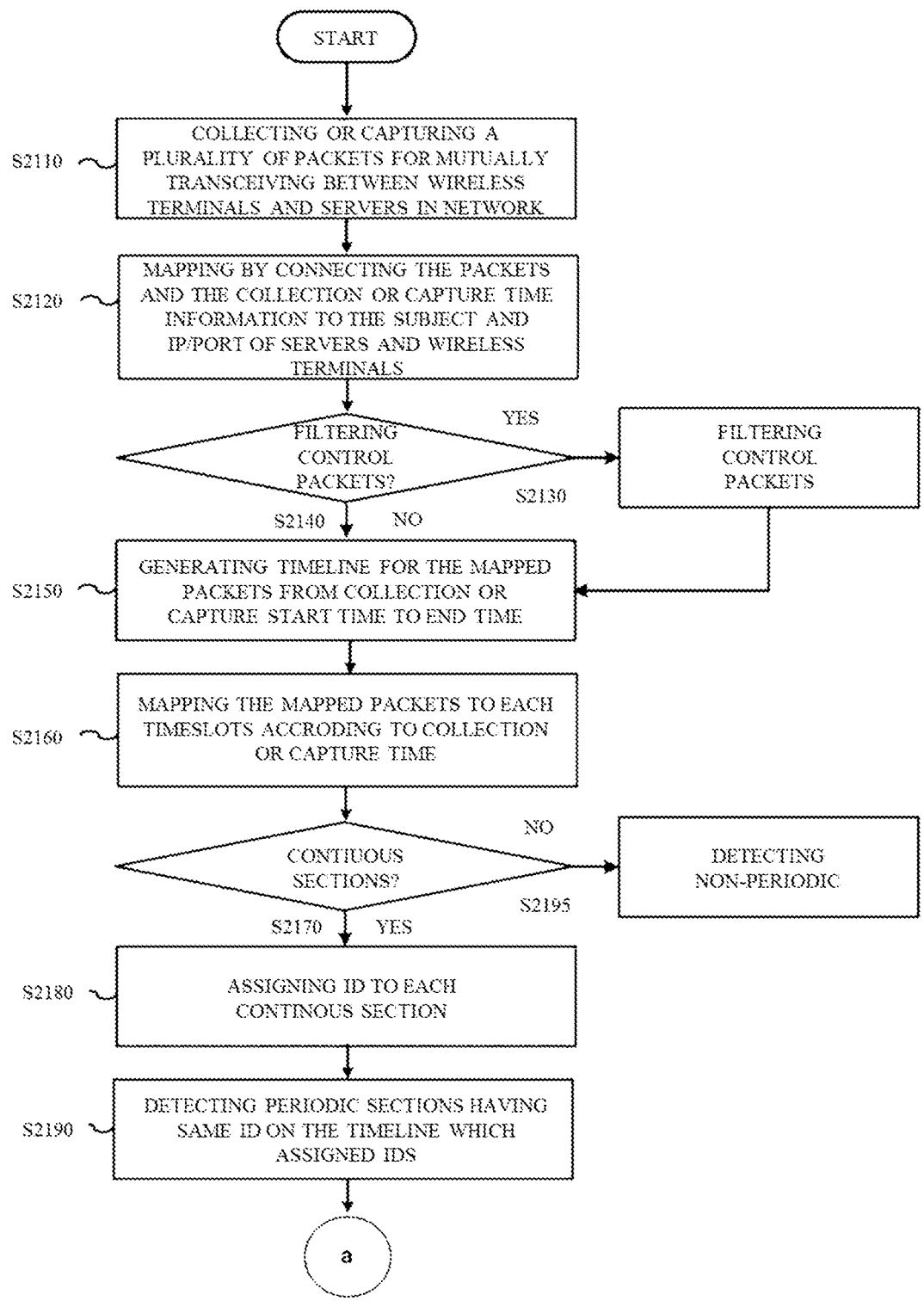
FIG. 21 shows one embodiment showing a process of detecting periodicity according to the present invention.

FIG. 21 shows the processes for detecting periodicity according to an embodiment of the present invention.

The device 100 for detecting keep-alive collects or captures a plurality of packets for mutually transceiving between a plurality of wireless terminals 200 and servers 300 in a communication network by the collection unit 10(S2110).

Next, The device 100 for detecting keep-alive connects the packets and packet collection or capture time information collected or captured by the collection unit 10 to the subject and the object of transceiving each packet, that is, each wireless terminals 200 IP and servers 300 IP/PORT and maps the connected them, by the preprocessing unit 20 (S2120).

At this time, the preprocessing unit 20 in the device 100 for detecting keep-alive filters whether control packets are included in packets to be collected or captured by the collection unit 10 and excludes the filtered control packets in case of including the control packets(S2130).

After step S2130 or the control packets are not included (S2140), the device 100 for detecting keep-alive generates a timeline for the packets from the collecting or capturing start time to end time, by the slot allocation unit 30(S2150).

Then, the device 100 for detecting keep-alive maps the mapped packets by the slot allocation unit 30 to each time slots on the timeline according to the collecting or capturing time (S2160).

The device 100 for detecting keep-alive identifies by ID assigning unit 40 whether there are continuous sections on the timeline, if the continuous sections are being present (S2170), assigns ID (Identification) to the each continuous sections, and assigns a same ID when next non-empty slots are appeared continuously in a predetermined error range (S2180).

After that, the device 100 for detecting keep-alive detects periodic, by the keep-alive detection unit 50, for the sections having the identical ID on the timeline which assigned IDs by the ID assigning unit 40(S2190).

If the continuous sections are not present, the device 100 for detecting keep-alive detects non-periodic for the non-continuous section, by the keep-alive detection unit 50(S2195).

Figure 22:
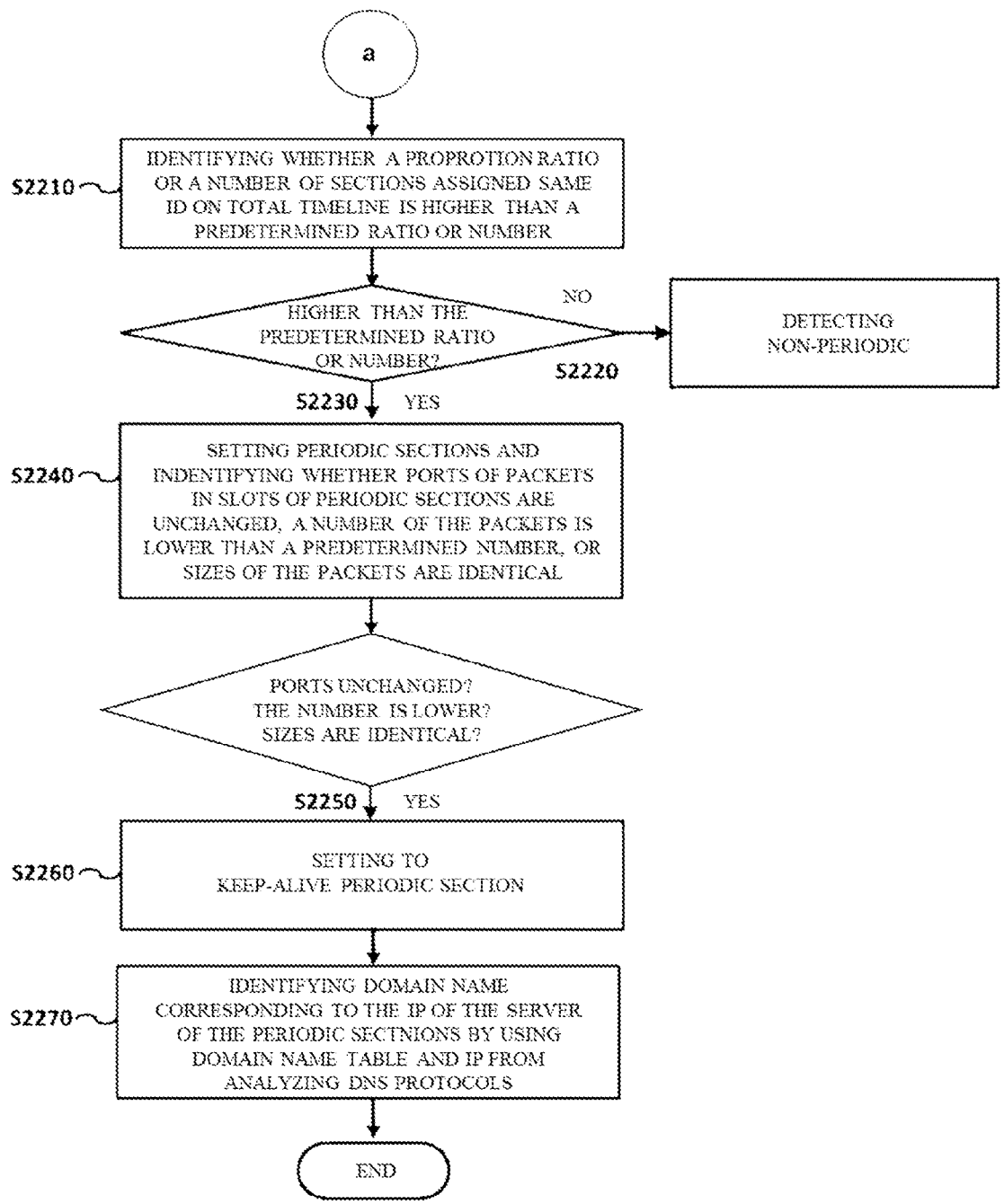
FIG. 22 shows one embodiment showing a process of detecting keep-alive periodicity according to the present invention.

FIG. 22 shows the processes for detecting keep-alive periodicity according to an embodiment of the present invention.

The device 100 for detecting keep-alive identifies whether the proportion ratio or the number of the sections assigned by same ID on the ID assigned whole timeline is more than a predetermined ratio or a predetermined number, by the keep-alive detection unit 50(S2210).

In the step S2210, if the proportion ratio or the number of the sections assigned by same ID on the ID assigned whole timeline is not more than a predetermined ratio or a predetermined number (S2220), the device 100 for detecting keep-alive detects non-periodic for the sections, by the keep-alive detection unit 50.

In the step S2210, if the proportion ratio or the number of the sections assigned by same ID on the ID assigned whole timeline is more than a predetermined ratio or a predetermined number (S2230), the device 100 for detecting keep-alive detects and sets periodic for the sections, by the keep-alive detection unit 50, and identifies whether the ports of packets corresponding to the wireless terminal 200 is unchanged, a number of the packets is lower than a predetermined number, or sizes of the packets are identical by analyzing packets presented in the slots of the periodic sections (S2240).

As a results of the step S2240, if the ports of packets in the slots of the periodic sections are continuously changing (S2250), the keep-alive detection unit 50 of the device 100 for detecting keep-alive sets the periodic sections to keep-alive periodic sections (S2260).

After that, check unit 60 identifies domain name corresponding to the IP of server 300 of the periodic sections, by using domain name table and IP from analyzing DNS (Domain Name System) protocols (S2270).

In this, the step S2270 can be included in any processes after S2190.

According to an embodiment of the present invention, periodic polling connection sections for a specific server for each application installed at the wireless terminal are detected, it determines whether the sections are keep-alive sections or Keep Alive sections, and therefore unnecessary performance causing the network load may be blocked or controlled for each application, thereby to optimally use the network at the wireless terminal.

According to another embodiment of the present invention, mobile-service company's networks expansion cost may be minimized by optimization of network use.

According to further another embodiment of the present invention, on optimizing network use, it is possible to minimize dissatisfaction for the wireless terminal's user caused by data communication delay, etc. and to greatly reduce battery consumption for the wireless terminal.

What is claimed is:

1. A device for detecting keep-alive, comprising:
a collecting unit for collecting or capturing a plurality of packets transceiving between a plurality of wireless terminals and a plurality of servers;
a preprocessing unit for mapping collecting or capturing time information of the packets which collected or captured by the collecting unit to at least one of identification information of wireless terminal, server identification information and port information;
a slot allocation unit for allocating the mapped packets to each of a plurality of time slots on a timeline which generated according to the collecting or capturing time information;
an ID(identification) assigning unit for assigning IDs to each of a plurality of sections on the timeline, wherein the assigning unit assigning same IDs to sections having time slots in which the packets are continuously allocated within a predetermined range; and
a keep-alive detection unit for setting the sections which assigned same IDs to periodic sections, and for determining the periodic sections as keep-alive when the port information of the packets allocated to the time slots on the periodic sections is continuously unchanged.

2. The device of claim 1, wherein the keep-alive detection unit detects the keep-alive if a number of the packets allocated to the time slots is lower than a predetermined number or sizes of the packets are identical.

3. The device of claim 1, wherein the preprocessing unit filtering network control packets from the plurality of packets collected or captured by the collecting unit.

4. The device of claim 3, wherein the network control packets are comprising at least one of a TCP connection packet, a network disconnecting packet, a reset packet and acknowledge packet.

5. The device of claim 1, wherein the slot allocation unit determining a size of the time slots in predetermined time range.

6. The device of claim 5, wherein the timeline being generated by connecting the time slots from the collecting or capturing start time to the collecting or capturing end time.

7. The device of claim 1, wherein the ID assigning unit setting sections that appeared continuously and more than a certain proportion percentage on the timeline to continuous sections, and assigning ID to the continuous sections.

8. The device of claim 1, wherein the ID assigning unit combining in part of the periodic sections when periods of the periodic sections are similar within a predetermined range.

9. The device of claim 1, wherein the keep-alive detection unit determining sections having same IDs to periodic sections when the sections having same IDs are present more than a certain percentage proportion in the timeline.

10. The device of claim 1, wherein the keep-alive detection unit determining the periodic sections to the keep-alive sections when the port information of the packets is continuously changing during more than a predetermined time or more than a certain percentage proportion in the periodic sections.

11. A method for detecting keep-alive, comprising:
collecting or capturing, a plurality of packets transceiving between a plurality of wireless terminals and a plurality of servers;
mapping, collecting or capturing time information of the packets to at least one of identification information of wireless terminal, server identification information and port information;
allocating, the mapped packets to each of a plurality of time slots on a timeline which generated according to the collecting or capturing time information;
assigning, IDs to each of a plurality of sections on the timeline, wherein the assigning unit assigning same IDs to sections which having the time slots in which the packets are continuously allocated within a predetermined range;
setting, the sections which having same IDs to periodic sections; and
determining, the periodic sections to keep-alive sections when port information of the packets allocated to the time slots on the periodic sections is continuously unchanged.

12. A non-transitory computer-readable recording medium for recording programs to perform the method of claim 11.

* * * * *